United States Patent
Uenoyama et al.

(10) Patent No.: US 11,891,079 B2
(45) Date of Patent: Feb. 6, 2024

(54) INFORMATION PROCESSING APPARATUS AND INFORMATION PROCESSING METHOD

(71) Applicant: TOYOTA JIDOSHA KABUSHIKI KAISHA, Toyota (JP)

(72) Inventors: Naoki Uenoyama, Nagoya (JP); Josuke Yamane, Nisshin (JP); Hikaru Gotoh, Nagoya (JP); Takumi Fukunaga, Nisshin (JP); Shin Sakurada, Toyota (JP); Soutaro Kaneko, Nagoya (JP); Rio Minagawa, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 514 days.

(21) Appl. No.: 17/145,443

(22) Filed: Jan. 11, 2021

(65) Prior Publication Data
US 2021/0221395 A1     Jul. 22, 2021

(30) Foreign Application Priority Data

Jan. 17, 2020    (JP) ................................ 2020-006285

(51) Int. Cl.
| | |
|---|---|
| B60W 50/14 | (2020.01) |
| B60W 30/16 | (2020.01) |
| H04W 4/46 | (2018.01) |
| B60W 30/09 | (2012.01) |
| H04W 4/024 | (2018.01) |

(Continued)

(52) U.S. Cl.
CPC ............ *B60W 50/14* (2013.01); *B60W 30/16* (2013.01); *H04W 4/46* (2018.02); *B60W 2552/53* (2020.02); *B60W 2554/4041* (2020.02); *B60W 2554/4042* (2020.02); *B60W 2554/4045* (2020.02); *B60W 2554/802* (2020.02); *B60W 2554/804* (2020.02)

(58) Field of Classification Search
CPC ..................................................... B60W 50/14
See application file for complete search history.

(56) References Cited

U.S. PATENT DOCUMENTS

| | | | | |
|---|---|---|---|---|
| 2018/0376308 | A1* | 12/2018 | Xiao | ........................ H04L 45/22 |
| 2020/0079379 | A1* | 3/2020 | Mimura | ................. B60W 10/20 |

(Continued)

FOREIGN PATENT DOCUMENTS

| | | |
|---|---|---|
| JP | 11-213299 A | 8/1999 |
| JP | 2012-118868 A | 6/2012 |
| JP | 2017-16200 A | 1/2017 |

(Continued)

*Primary Examiner* — Joseph H Feild
*Assistant Examiner* — Pameshanand Mahase
(74) *Attorney, Agent, or Firm* — Oblon, McClelland, Maier & Neustadt, L.L.P.

(57) ABSTRACT

An information processing apparatus is mounted on a vehicle. The information processing apparatus includes a controller configured to detect whether or not the vehicle and a following vehicle are traveling on a same lane, determine whether or not the following vehicle is approaching at a speed faster than a speed of the vehicle, and output a guidance to change lanes, in a case where the vehicle and the following vehicle are traveling on the same lane, the following vehicle is approaching at a speed faster than the speed of the vehicle, and a guidance target exclusion condition is not satisfied.

16 Claims, 5 Drawing Sheets

(51) Int. Cl.
*G08G 1/08* (2006.01)
*G08G 1/07* (2006.01)

(56) References Cited

U.S. PATENT DOCUMENTS

2020/0238904 A1* 7/2020 Kim ................... B60W 50/14
2020/0290618 A1* 9/2020 Conrad ............... B60W 30/162

FOREIGN PATENT DOCUMENTS

| JP | 2017-129980 A | 7/2017 | | |
|---|---|---|---|---|
| JP | 2017129980 | * | 7/2017 | ............. B60R 21/00 |
| JP | 2018-146461 A | 9/2018 | | |
| WO | WO 2018/123344 A1 | 7/2018 | | |
| WO | WO-2018123344 A1 | * | 7/2018 | ............. B60R 21/00 |

* cited by examiner

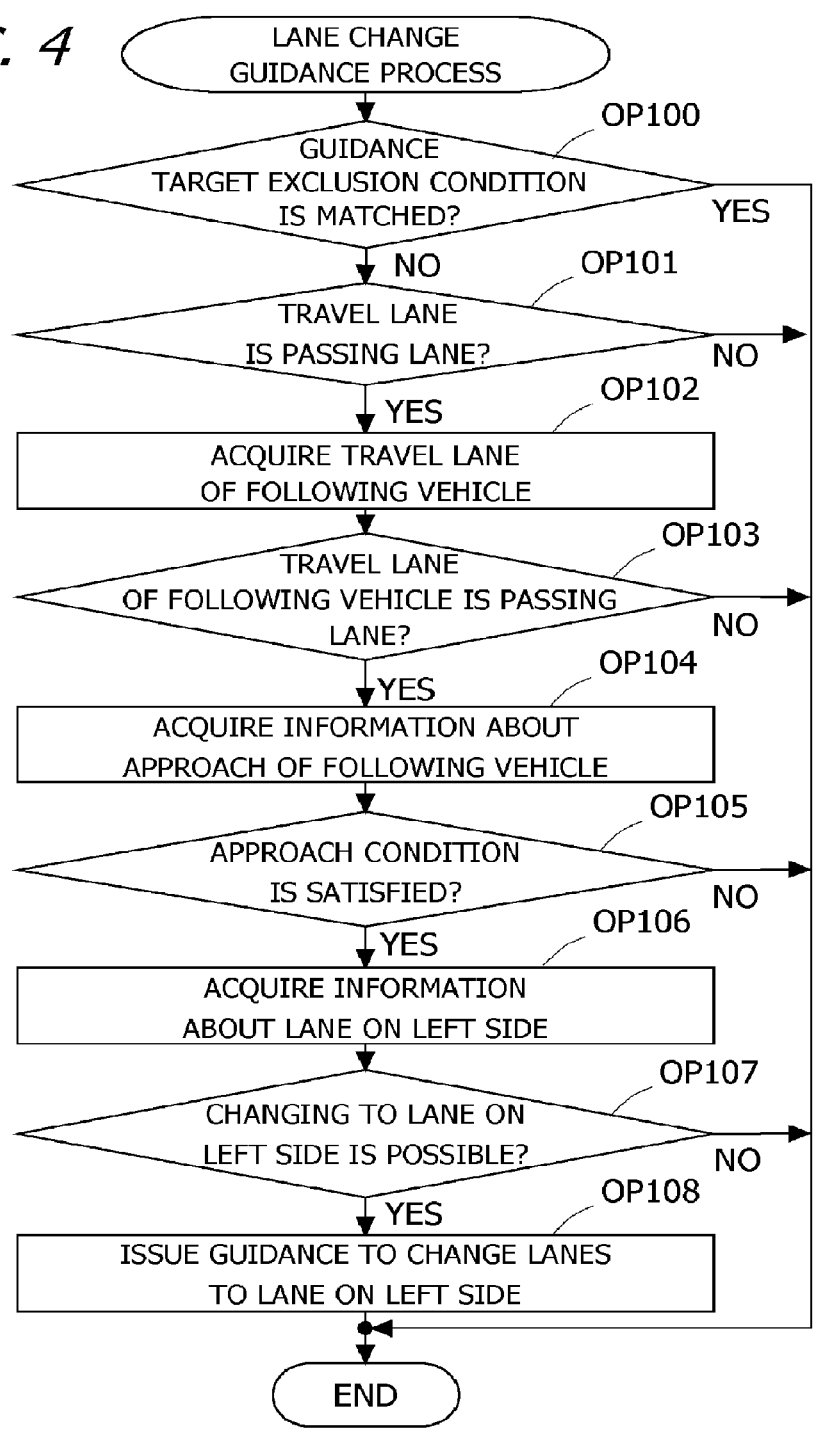

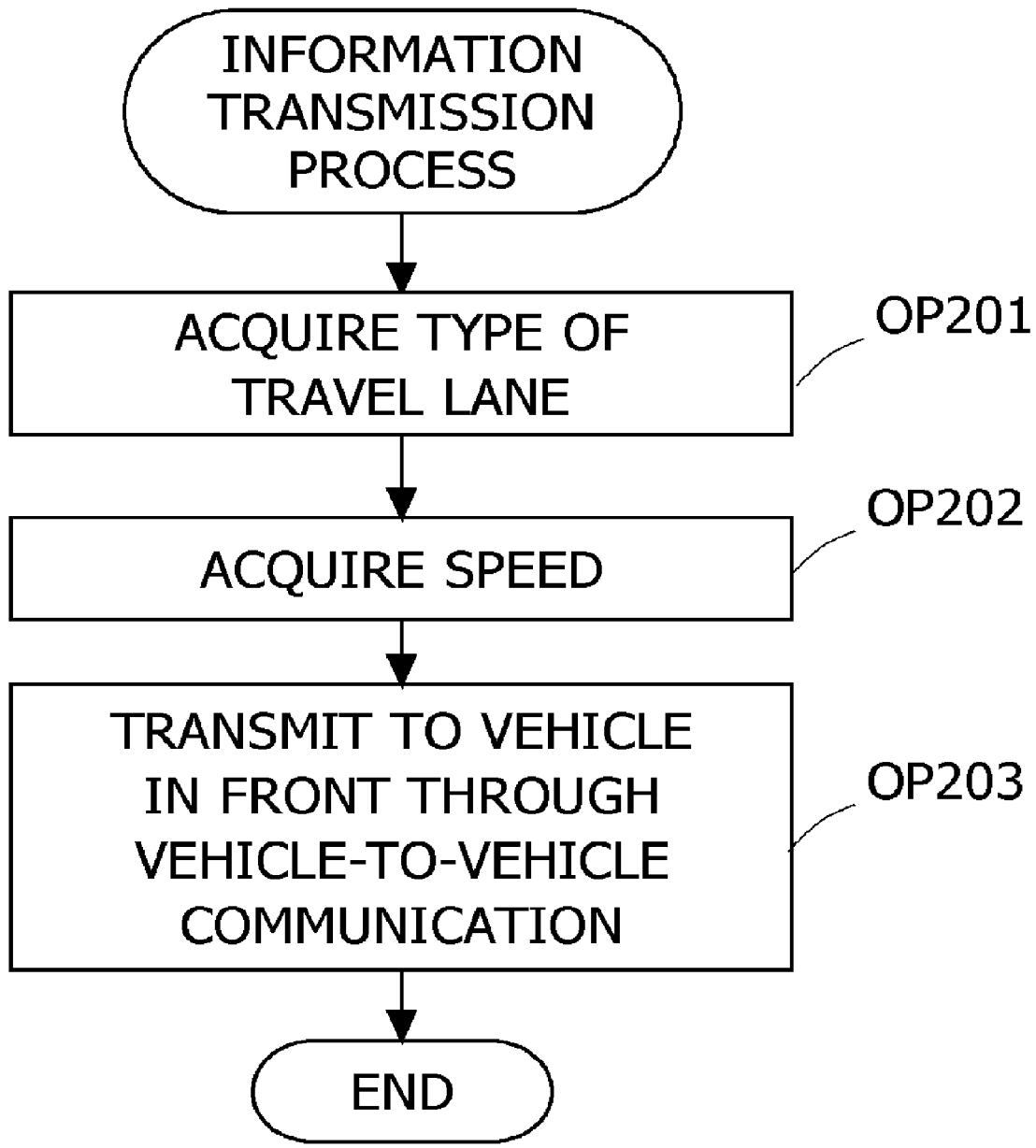

INFORMATION PROCESSING APPARATUS AND INFORMATION PROCESSING METHOD

CROSS REFERENCE TO RELATED APPLICATION

This application claims the benefit of Japanese Patent Application No. 2020-006285, filed on Jan. 17, 2020, which is hereby incorporated by reference herein in its entirety.

BACKGROUND

Technical Field

The present disclosure relates to an information processing apparatus and an information processing method.

Description of the Related Art

There is disclosed a technique of issuing a guidance regarding an appropriate lane according to the state of an intersection in a traveling direction of a vehicle (for example, Patent document 1).

CITATION LIST

Patent Document

[Patent document 1] Japanese Patent Laid-Open No. 2018-146461

However, traveling on an expressway or the like at a slower speed than nearby vehicles may impede the flow of traffic, for example.

An object of an aspect of the disclosure is to provide an apparatus that is capable of suppressing worsening of flow of vehicles on a road.

SUMMARY

An aspect of the present disclosure is an information processing apparatus mounted on a vehicle, the information processing apparatus comprising a controller configured to:
  detect whether or not the vehicle and a following vehicle are traveling on a same lane,
  determine whether or not the following vehicle is approaching at a speed faster than a speed of the vehicle, and
  output a guidance to change lanes, in a case where the vehicle and the following vehicle are traveling on the same lane, the following vehicle is approaching at a speed faster than the speed of the vehicle, and a guidance target exclusion condition is not satisfied.

Another aspect of the present disclosure is an information processing method performed by a computer that is mounted on a vehicle, the information processing method comprising:
  detecting whether or not the vehicle and a following vehicle are traveling on a same lane,
  determining whether or not the following vehicle is approaching at a speed faster than a speed of the vehicle, and
  outputting a guidance to change lanes, in a case where the vehicle and the following vehicle are traveling on the same lane, the following vehicle is approaching at a speed faster than the speed of the vehicle, and a guidance target exclusion condition is not satisfied.

According to the present disclosure, worsening of flow of vehicles on a road may be suppressed.

BRIEF DESCRIPTION OF DRAWINGS

FIG. 4 is an example of a flowchart of a lane change guidance process by the vehicle; and FIG. 5 is an example of a flowchart of an information transmission process by the vehicle.

DESCRIPTION OF THE EMBODIMENTS

Figure 1:
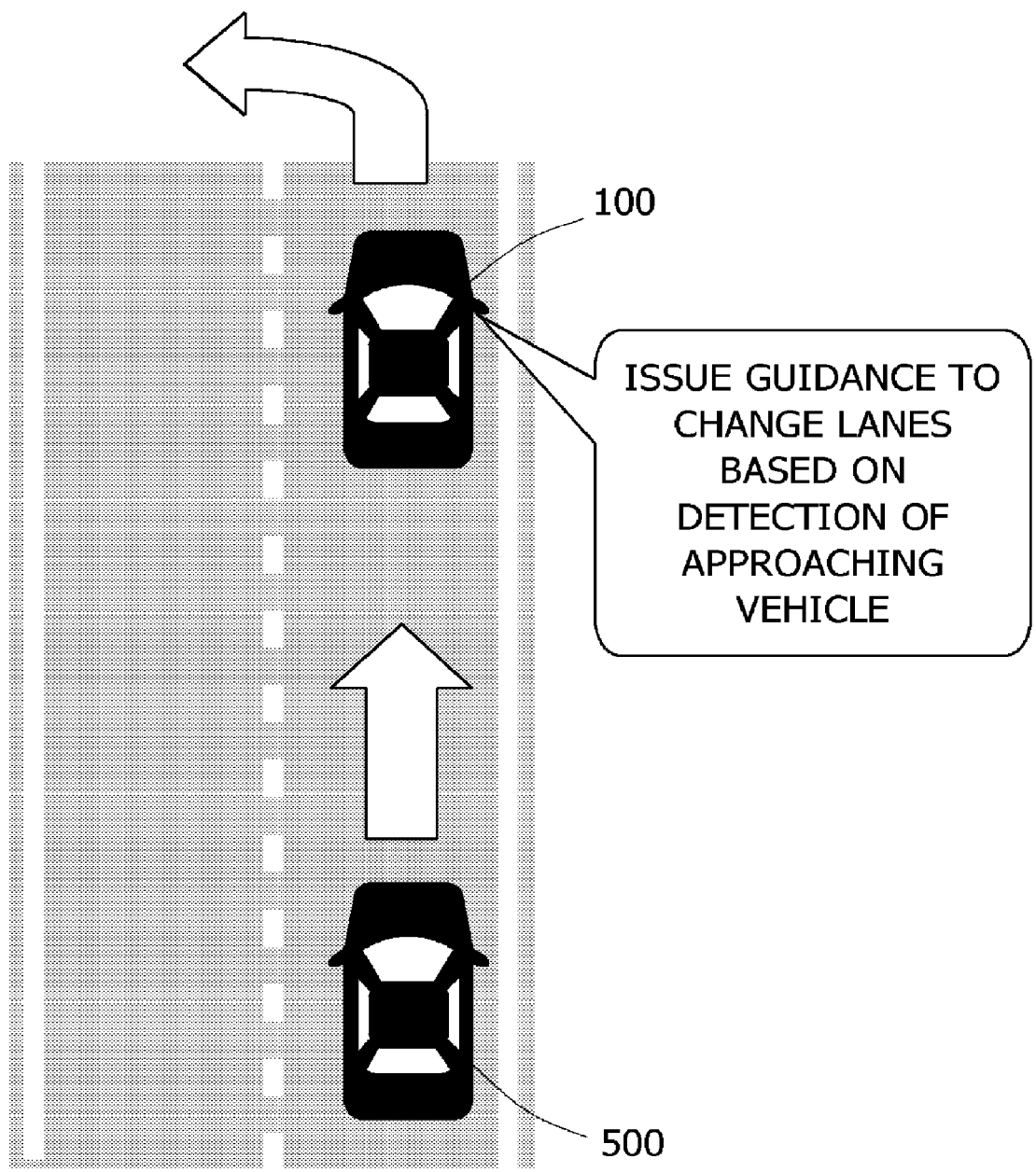
FIG. 1 is a diagram for describing processing by a vehicle according to a first embodiment.

An aspect of the present disclosure is an information processing apparatus that is mounted on a vehicle. The information processing apparatus is an on-board unit, a data communication device, or an electronic control unit (ECU), for example. The information processing apparatus includes a controller configured to: detect whether or not the vehicle and a following vehicle are traveling on a same lane, determine whether or not the following vehicle is approaching at a speed faster than a speed of the vehicle, and output a guidance to change lanes, in a case where the vehicle and the following vehicle are traveling on the same lane, the following vehicle is approaching at a speed faster than the speed of the vehicle, and a guidance target exclusion condition is not satisfied.

Whether or not the vehicle and the following vehicle are traveling on the same lane is determined by identifying the lane where the vehicle is traveling and the lane where the following vehicle is traveling, for example. The lane where the vehicle is traveling may be acquired based on a captured image of a camera that takes a predetermined range in front of the vehicle as a capturing range, or position information or the like of the vehicle, for example. These are, however, not limitation. The lane where the following vehicle is traveling may, but not limited to, be acquired from the following vehicle through vehicle-to-vehicle communication or from a captured image of a camera that takes a predetermined range behind the vehicle as a capturing range, for example.

Whether or not the following vehicle is approaching at a speed faster than the speed of the vehicle may be determined based on at least one of a relative speed, an inter-vehicular distance and a inter-vehicular time to the following vehicle, for example. The relative speed to the following vehicle may be acquired based on the speed of the following vehicle that is received from the following vehicle through vehicle-to-vehicle communication, or may be acquired by a sensor, for example. The inter-vehicular distance and the inter-vehicular time to the following vehicle may be acquired based on a captured image of the camera that takes a predetermined range behind the vehicle as a capturing range, or may be acquired by a sensor, for example. A sensor that is capable of acquiring the relative speed, the inter-vehicular distance and the inter-vehicular time to the following vehicle is a millimeter-wave radar or light detection and ranging (LIDAR), for example. The camera is also one of sensors that are capable of acquiring the relative speed, the inter-vehicular distance and the inter-vehicular time to the following vehicle. Additionally, a method of acquiring the relative speed, the inter-vehicular distance and the inter-vehicular time to the following vehicle is not limited to those mentioned above.

The guidance target exclusion condition is a condition for excluding a vehicle from a target of guidance to change lanes in a case where the vehicle is in a state where changing lanes is not possible. For example, the guidance target exclusion condition is one or more among the following: the vehicle is near an intersection, the road where the vehicle is traveling has one lane, the vehicle is in a decelerating state, or the like. In the case where a plurality of guidance target exclusion conditions is set, if at least one of the plurality of conditions is matched, the guidance target exclusion condition is assumed to be satisfied, and the guidance to change lanes is not output. Additionally, the guidance target exclusion conditions are not limited to those mentioned above.

The guidance to change lanes may be output to a display installed inside the vehicle in the form of an image or text data, or may be output from a speaker in the form of audio data, for example. Alternatively, an image or text data and audio data may be combined and issued as the guidance to change lanes.

According to an aspect of the present disclosure, the guidance to change lanes is issued when a following vehicle that is approaching at a speed faster than the speed of the vehicle is detected, and thus, if a driver changes lanes according to the guidance, it is possible to smoothly give way to the following vehicle. Worsening of flow of vehicles on a road may thereby be suppressed.

According to an aspect of the present disclosure, the controller may be configured to acquire information about a traveling state of a vehicle on a first lane that is adjacent to the lane where the vehicle is traveling and that is not a passing lane. In this case, the controller may output a guidance to change lanes to the first lane, in a case where the vehicle is allowed to change lanes to the first lane. Whether or not the vehicle is allowed to change lanes to the first lane may be determined based on whether or not there is another vehicle on the first lane, behind the vehicle, for example. The vehicle may thus be safely guided to change lanes.

According to an aspect of the present disclosure, the controller may determine whether or not the vehicle and the following vehicle are traveling on the same lane that is a passing lane. In this case, the guidance to change lanes may be output in a case where the vehicle and the following vehicle are traveling on the same passing lane and the following vehicle is approaching at a speed faster than the speed of the vehicle. For example, in Japan, in the case where there are two or more one-way lanes, the lanes are divided by a white broken lane line, and white solid edge lines indicating side strips are present on both sides of the road. Furthermore, in Japan, the rightmost lane of an expressway is the passing lane. Accordingly, traveling of the vehicle on a passing lane is detected when a captured image of a camera that takes a predetermined range around the vehicle as a capturing range shows a white solid line on the right side of the vehicle in the traveling direction and a white broken line on the left side of the vehicle in the traveling direction. Additionally, gaps of a white broken line that is used as the lane line is defined by law.

On an expressway, traveling on the passing lane at a speed slower than those of vehicles in the surroundings highly likely worsens the flow of vehicles on the passing lane and also on other traveling lanes. Therefore, according to an aspect of the present disclosure, by identifying that a vehicle is traveling on the passing lane, a guidance to change lanes may be issued in a situation where worsening of the flow of vehicles on all the lanes on the road is likely to occur. Moreover, it may also be suppressed that the guidance to change lanes is output frequently.

Furthermore, according to an aspect of the present disclosure, the controller may transmit, through vehicle-to-vehicle communication and at a predetermined timing, the speed of the vehicle to a vehicle traveling in front of the vehicle. The predetermined timing is every predetermined period of time and occurrence of a predetermined event, for example. The predetermined event is stepping of a brake pedal, for example. These are, however, not limitation. The vehicle traveling in front may thereby be notified of the speed of the subject vehicle. For example, in the case where the vehicle traveling in front is a vehicle that performs the same processes as those of the subject vehicle described above, information used to detect approach of the subject vehicle may be provided to the vehicle traveling in front, and the vehicle in front thus changes lanes. The subject vehicle is thereby enabled to travel smoothly, and worsening of the flow of vehicles on the road may be suppressed.

In the following, an embodiment of the present disclosure will be described with reference to the drawings. The configuration of the embodiment described below is an example, and the present disclosure is not limited to the configuration of the embodiment.

First Embodiment

FIG. 1 is a diagram for describing processing by a vehicle 100 according to a first embodiment. In the first embodiment, the vehicle 100 detects a vehicle 500 that is approaching from behind, and guides and urges a driver to change lanes and give way to the vehicle 500. More specifically, the vehicle 100 determines whether or not the following vehicle 500 is traveling on a same passing lane as the vehicle 100. Next, in the case where the following vehicle 500 is traveling on the same passing lane as the vehicle 100, the vehicle 100 detects that the following vehicle 500 is approaching at a speed faster than that of the vehicle 100. The vehicle 100 determines whether or not it is possible to change lanes to a lane on a left side, and in the case where it is possible to change lanes to the lane on the left side, a guidance to change lanes to the lane on the left side is output. The lane on the left side of the passing lane is an example of "first lane".

Additionally, in the first embodiment, a road environment according to the Traffic Road Act in Japan is assumed. As illustrated in FIG. 1, in the first embodiment, a road where white solid edge lines indicating side strips are drawn on both edges and lanes are divided by a white broken lane line is assumed. Gaps of the broken line that is used as the lane line is determined to be 1.5 meters, for example. In the case of a road with two or more one-way lanes, a rightmost lane is assumed to be the passing lane.

Traveling on the passing lane at a speed slower than those of vehicles in the surroundings possibly worsens the flow of vehicles on the passing lane, and moreover, on all the lanes on the road. With the vehicle 100 according to the first embodiment, a guidance to change lanes is issued when the approaching vehicle 500 from behind is detected, and thus, the vehicle 100 may change lanes and smoothly give way before the following vehicle 500 catches up with the vehicle 100. Accordingly, worsening of the flow of vehicles on the road may be suppressed.

Figure 2:
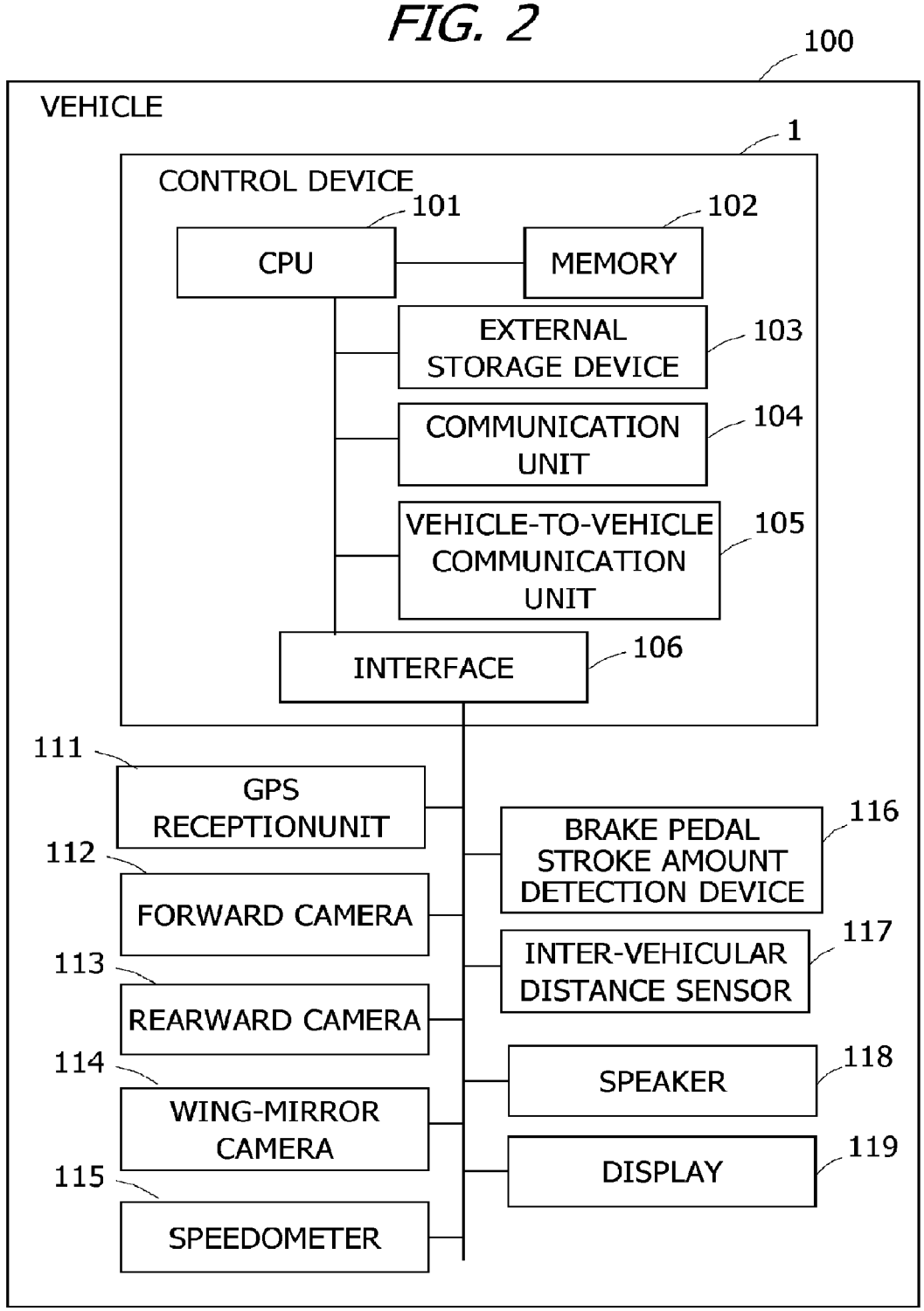
FIG. 2 is a diagram illustrating an example of a hardware configuration of the vehicle according to the first embodiment.

FIG. 2 is a diagram illustrating an example of a hardware configuration of the vehicle 100 according to the first embodiment. For example, the vehicle 100 is an automobile that travels by being driven by a driver. Additionally, FIG. 2 extracts and illustrates the hardware configuration related to the processing described in the first embodiment, among the hardware configuration of the vehicle 100. As the hardware configuration, the vehicle 100 includes a control device 1, a GPS reception unit 111, a forward camera 112, a rearward camera 113, a wing-mirror camera 114, a speedometer 115, a brake pedal stroke amount detection device 116, an inter-vehicular distance sensor 117, a speaker 118, and a display 119.

The GPS reception unit 111 receives radio waves carrying time signals from a plurality of global positioning satellites orbiting the Earth, and stores the time signals in a register of the control device 1, for example. Latitude and longitude indicating a position on the Earth are acquired as position information based on detection signals from the GPS reception unit 111, for example.

The forward camera 112 is a camera that is installed at a front part of the vehicle 100 in a manner facing outward, and that takes a predetermined range in front of the vehicle 100 as a capturing range, for example. The rearward camera 113 is a camera that is installed at a rear part of the vehicle 100 in a manner facing outward, and that takes a predetermined range behind the vehicle 100 as a capturing range, for example. Those used as driving recorders may be used as the forward camera 112 and the rearward camera 113, for example, or the forward camera 112 and the rearward camera 113 that are dedicated to the processing according to the first embodiment may be provided.

The wing-mirror camera 114 is a camera that includes, in a capturing range, a wing mirror installed on the vehicle 100, one for each of the opposite sides. For example, the wing-mirror camera 114 may be provided for one or each of two wing mirrors on two sides. For example, in Japan, the rightmost lane is the passing lane, and in the case of giving way, one usually changes lanes to a lane on the left side, and thus, the wing-mirror camera 114 may be provided just for the left wing mirror. Furthermore, the wing-mirror camera 114 may be a camera that is provided at a position of the wing mirror instead of the wing mirror so as to serve as the wing mirror.

The speedometer 115 measures the speed of the vehicle 100. The brake pedal stroke amount detection device 116 detects a pedaling amount of a brake pedal by a driver. The inter-vehicular distance sensor 117 is a sensor that is provided at a rear part of the vehicle 100, and that measures an inter-vehicular distance to a vehicle behind, for example. The inter-vehicular distance sensor 117 is a millimeter-wave radar, an optical camera, a stereo camera, a LIDAR or the like, for example. Furthermore, the inter-vehicular distance sensor 117 may be provided at each of front, left and right parts of the vehicle 100, for example. Moreover, the inter-vehicular distance sensor 117 may be used as an obstacle sensor that acquires a distance to an obstacle in the surroundings of the vehicle 100.

For example, the control device 1 is, but not limited to, an ECU. As hardware configuration, the control device 1 includes a central processing unit (CPU) 101, a memory 102, an external storage device 103, a communication unit 104, a vehicle-to-vehicle communication unit 105, and an interface 106. The memory 102 and the external storage device 103 are each a computer-readable recording medium. The control device 1 is an example of "information processing apparatus".

The external storage device 103 stores various programs, and data that is used by the CPU 101 at the time of execution of each program. For example, the external storage device 103 is an erasable programmable ROM (EPROM) and/or a hard disk drive. Programs held in the external storage device 103 include the operating system (OS), a lane change guidance control program, and various other application programs, for example. The lane change guidance control program is a program for detecting an approaching vehicle from behind, and for guiding a driver to change lanes.

The memory 102 is a memory that provides, to the CPU 101, a storage area and a work area for loading programs stored in the external storage device 103, and that is used as a buffer. The memory 102 includes semiconductor memories such as a read only memory (ROM) and a random access memory (RAM), for example.

The CPU 101 performs various processes by loading the OS and various application programs held in the external storage device 103 into the memory 102 and executing the same. The number of CPUs 101 is not limited to one, and a plurality of CPUs may be provided. The CPU 101 is an example of "controller" of "information processing apparatus".

The communication unit 104 is an interface through which information is input/output from a network. The communication unit 104 performs communication through a mobile communication system such as long term evolution (LTE), LTE-Advanced and 5th generation (5G) or in WiFi communication, and connects to a public network such as the Internet. The vehicle-to-vehicle communication unit 105 performs vehicle-to-vehicle communication with other vehicles. For example, vehicle-to-vehicle communication uses dedicated short range communications (DSRC).

The interface 106 connects hardware structural elements of the vehicle 100 other than the control device 1 to the control device 1. The GPS reception unit 111, the forward camera 112, the rearward camera 113, the wing-mirror camera 114, the speedometer 115, the brake pedal stroke amount detection device 116, the inter-vehicular distance sensor 117, the speaker 118, the display 119 and the like are connected to the interface 106. Additionally, the hardware configuration of the vehicle 100 illustrated in FIG. 2 is merely an example and is not restrictive.

Figure 3:
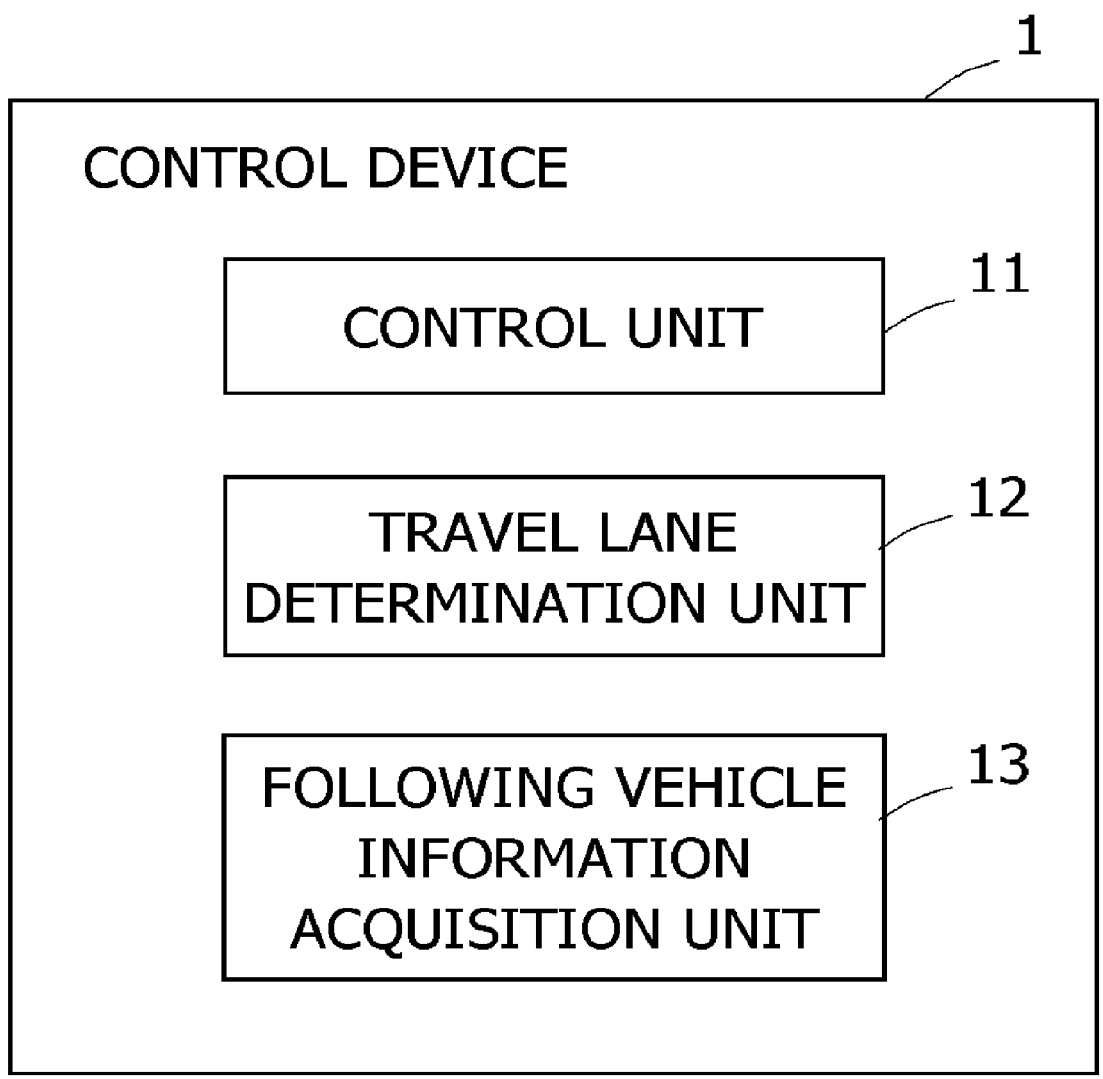
FIG. 3 is a diagram illustrating an example of a functional configuration of the control device.

FIG. 3 is a diagram illustrating an example of a functional configuration of the control device 1. As functional structural elements, the control device 1 includes a control unit 11, a travel lane determination unit 12, and a following vehicle information acquisition unit 13. These functional structural elements may be implemented by the CPU 101 executing predetermined programs.

The travel lane determination unit 12 repeatedly determines, every predetermined period of time, whether or not the lane where the vehicle 100 is traveling is the passing lane, for example. A method of determining whether or not the travel lane of the vehicle 100 is the passing lane may be any of the following methods, for example.

A first method of determining that the travel lane of the vehicle 100 is the passing lane is a method of performing determination by image recognition processing of a captured image of the forward camera 112. With this method, the travel lane determination unit 12 determines that the vehicle 100 is traveling on the passing lane, in a case where, in a captured image of the forward camera 112, there is a white solid edge line on the right side of the vehicle 100 in the traveling direction and there is a white broken lane line on the left side in the traveling direction. Additionally, that the traveling lane of the vehicle 100 is the passing lane may be determined from a captured image of the rearward camera 113, without being limited to a captured image of the forward camera, for example.

A second method of determining that the travel lane of the vehicle 100 is the passing lane is a method of performing determination using position information of the vehicle 100. With this method, the travel lane determination unit 12 acquires position information of the vehicle 100, transmits an inquiry to a predetermined server together with the position information of the vehicle 100, and acquires the type of the travel lane from the predetermined server, for example. The position information of the vehicle 100 that is acquired by the GPS reception unit 111 is used, for example.

In the case of determining that the travel lane of the vehicle 100 is the passing lane, the travel lane determination unit 12 outputs the determination result to the control unit 11.

The following vehicle information acquisition unit 13 acquires information about a vehicle traveling behind the vehicle 100. In the following, the vehicle traveling behind the vehicle 100 will be referred to as a following vehicle. Information about the following vehicle that is acquired by the following vehicle information acquisition unit 13 includes information about approach of the following vehicle and the travel lane of the following vehicle, for example. Information about approach of the following vehicle includes a speed of the following vehicle, an inter-vehicular distance to the following vehicle, and an inter-vehicular time to the following vehicle, for example, and the following vehicle information acquisition unit 13 acquires at least one of these information pieces.

In the case where the following vehicle is capable of vehicle-to-vehicle communication, the following vehicle information acquisition unit 13 may receive and acquire, through the vehicle-to-vehicle communication unit 105 and from the following vehicle, at least one of the speed of the following vehicle and the type of the travel lane of the following vehicle. The type of the travel lane of the following vehicle is acquired by the following vehicle itself by a predetermined method, for example.

For example, these information pieces may be acquired by the following vehicle information acquisition unit 13 transmitting to the following vehicle an acquisition request for information about the following vehicle and receiving, from the following vehicle, information about the following vehicle as a response to the acquisition request. Alternatively, these information pieces may be acquired by receiving information that the following vehicle transmits to a preceding vehicle every predetermined period of time or with a predetermined event as a trigger. That a pedaling amount of the brake pedal is equal to or greater than a predetermined value may be taken as the predetermined event, for example. Additionally, the relative speed to the following vehicle may be acquired based on a detection value of the inter-vehicular distance sensor 117.

The following vehicle information acquisition unit 13 acquires the inter-vehicular distance to the following vehicle based on a detection value of the inter-vehicular distance sensor 117 or based on an analysis result of a captured image of the rearward camera 113, for example. The inter-vehicular time to the following vehicle is a time from the vehicle 100 passing a location A to a time when the following vehicle passes the same location A. The following vehicle information acquisition unit 13 acquires the inter-vehicular time to the following vehicle by analyzing the captured image of the rearward camera 113 over a predetermined period of time, for example.

The following vehicle information acquisition unit 13 may acquire the type of the travel lane of the following vehicle based on analysis of the captured image of the rearward camera 113, for example. The following vehicle information acquisition unit 13 determines that the following vehicle is traveling on the passing lane, in a case where, in the captured image of the rearward camera 113, there is a white solid edge line on the right side of the following vehicle and a white broken lane line on the left side, for example.

The following vehicle information acquisition unit 13 may first attempt to acquire the speed of the following vehicle and/or the type of the travel lane of the following vehicle through vehicle-to-vehicle communication, for example. In the case where these information pieces are not acquired through vehicle-to-vehicle communication, the following vehicle information acquisition unit 13 may acquire at least one of the relative speed, the inter-vehicular distance and the inter-vehicular time to the following vehicle and the type of the travel lane of the following vehicle from the captured image of the rearward camera 113 and/or the detection value of the inter-vehicular distance sensor 117. In this case, which of the relative speed, the inter-vehicular distance and the inter-vehicular time to the following vehicle is acquired may be determined based on which of the above is to be used by the control unit 11, described later, to determine approach of the following vehicle. Additionally, the relative speed, the inter-vehicular distance and the inter-vehicular time to the following vehicle may be acquired constantly.

The control unit 11 determines, during traveling of the vehicle 100 on the passing lane, whether or not there is a vehicle on the passing lane that is approaching from behind. The control unit 11 acquires information indicating that the vehicle 100 is traveling on the passing lane, through input from the travel lane determination unit 12. Information indicating whether or not a following vehicle is traveling on the passing lane is acquired through inquiry to the following vehicle information acquisition unit 13, for example.

The control unit 11 determines whether or not there is a vehicle approaching from behind, based on whether an approach condition is satisfied or not, for example. A vehicle approaching from behind is a vehicle traveling at a speed faster than that of the vehicle 100. The approach condition is that (1) the relative speed of the vehicle 100 and the following vehicle is equal to or greater than a predetermined threshold, (2) the inter-vehicular distance between the vehicle 100 and the following vehicle is smaller than a predetermined threshold, or (3) the inter-vehicular time between the vehicle 100 and the following vehicle is smaller than a predetermined threshold. The threshold for the relative speed of the vehicle 100 and the following vehicle indicates that the speed of the following vehicle is faster than that of the vehicle 100, and is 10 to 30 km/h, for example. The threshold for the inter-vehicular distance between the vehicle 100 and the following vehicle may be changed according to the speed of the vehicle 100 in such a way that, for example, when the speed of the vehicle 100 is 80 km/h, the threshold is 80 meters, and when the speed is 100 km/h, the threshold is 100 meters. The threshold for the inter-vehicular time between the vehicle 100 and the following vehicle is 3 to 10 seconds, for example. However, these thresholds are examples and are not limited to the values mentioned above. The thresholds for the relative speed, the inter-vehicular distance and the inter-vehicular time to the following vehicle are set to such values that an inter-vehicular distance to the following vehicle that enables the vehicle 100 to change lanes sufficiently safely may be maintained, for example.

In the case where one, two or all of the approach conditions (1) to (3) are satisfied, the control unit 11 detects presence of a vehicle approaching from behind. In the case where a vehicle approaching from behind is detected, the control unit 11 determines whether or not it is possible to change lanes to a lane that is adjacent on the left, for example. That it is possible to change lanes to a lane that is adjacent on the left is determined based on absence of a vehicle on the lane in question, in a predetermined range behind the vehicle 100, for example. The control unit 11 acquires information indicating absence of a vehicle on the lane that is adjacent on the left, in a predetermined range behind the vehicle 100, based on any one of the captured image of the rearward camera 113, the captured image of the wing-mirror camera 114 for the left wing mirror, and a sensing result of the inter-vehicular distance sensor 117, for example.

In the case of determining that it is possible to change lanes to the lane that is adjacent on the left, the control unit 11 outputs a guidance to change lanes from the passing lane where the vehicle 100 is currently traveling. The guidance to change lanes may be output on the display 119 provided in the vehicle 100 in the form of texts or image data, or may be output from the speaker 118 in the form of audio data, or may be output in both manners, for example.

Additionally, the control unit 11 may determine whether or not the guidance target exclusion condition is satisfied for the vehicle 100, and in the case where the guidance target exclusion condition is satisfied, the control unit 11 may refrain from providing the guidance to change lanes. For example, in the case where the vehicle 100 is entering an intersection, the vehicle 100 is in a decelerating state, and it is difficult to change lanes even if there is a vehicle approaching from behind at a faster speed. Furthermore, it is also difficult to change lanes to give way to a following vehicle, in a case where the road where the vehicle 100 is traveling has one lane. The guidance target exclusion condition is a condition for excluding a situation as described above where it is difficult to change lanes to give way to a following vehicle from the target of guidance to change lanes.

For example, the guidance target exclusion condition is one or more of the vehicle 100 being close to an intersection, the road where the vehicle 100 is traveling having one lane, and the vehicle 100 being in the decelerating state. Additionally, the guidance target exclusion condition is not limited to those mentioned above. That the vehicle 100 is close to an intersection and that the road where the vehicle 100 is traveling has one lane may be detected from the position information of the vehicle 100 and road information, for example. Furthermore, that the road where the vehicle 100 is traveling has one lane may be acquired from an image recognition result for the captured image of the forward camera 112, for example. That the vehicle 100 is in the decelerating state is acquired based on the detection value of the speedometer 115 of the vehicle 100, for example.

Furthermore, to provide information to a vehicle traveling in front, the control unit 11 may transmit, through vehicle-to-vehicle communication, the speed and the type of the travel lane every predetermined period of time or with occurrence of a predetermined event as a trigger, for example. The speed is acquired from the speedometer 115. The type of the travel lane is acquired based on a determination result from the travel lane determination unit 12. The speed and the type of the travel lane may be transmitted by broadcast or multicast, for example.

<Flow of Processes>

FIG. 4 is an example of a flowchart of a lane change guidance process by the vehicle 100. For example, the process illustrated in FIG. 4 is repeatedly performed while the vehicle 100 is traveling or while the vehicle 100 is traveling on an expressway. That the vehicle 100 is traveling on an expressway may be determined from the position information and map data, or may be acquired from another system mounted on the vehicle 100, such as a car navigation system, for example. The performer of the process illustrated in FIG. 4 is the CPU 101 of the control device 1, but a description will be given taking a functional structural element as the performer for the sake of convenience.

In OP100, the control unit 11 determines whether or not the guidance target exclusion condition is satisfied. In the case where the guidance target exclusion condition is satisfied (OP100: YES), the process illustrated in FIG. 4 is ended. In the case where the guidance target exclusion condition is not satisfied (OP100: NO), the process proceeds to OP101.

In OP101, the control unit 11 determines whether or not the travel lane of the vehicle 100 is the passing lane. The travel lane of the vehicle 100 is input to the control unit 11 as a result of determination by the travel lane determination unit 12. In the case where the travel lane of the vehicle 100 is the passing lane (OP101: YES), the process proceeds to OP102. In the case where the travel lane of the vehicle 100 is not the passing lane (OP101: NO), the process illustrated in FIG. 4 is ended.

In OP102, the control unit 11 acquires information about the travel lane of a following vehicle from the following vehicle information acquisition unit 13. In OP103, the control unit 11 determines whether or not the travel lane of the following vehicle is the passing lane. In the case where the travel lane of the following vehicle is the passing lane (OP103: YES), the process proceeds to OP104. In the case where the travel lane of the following vehicle is not the passing lane (OP103: NO), the process illustrated in FIG. 4 is ended.

In OP104, the control unit 11 acquires information about approach of the following vehicle from the following vehicle information acquisition unit 13. In OP105, the control unit 11 determines whether or not the approach condition is satisfied, based on the information about approach of the following vehicle. In the case where the approach condition used in OP105 is the approach condition (1) described above, the relative speed to the following vehicle is acquired in OP104 as the information about approach of the following vehicle. In the case where the approach condition used in OP105 is the approach condition (2) described above, the inter-vehicular distance to the following vehicle is acquired in OP104 as the information about approach of the following vehicle. In the case where the approach condition used in OP105 is the approach condition (3) described above, the inter-vehicular time to the following vehicle is acquired in OP104 as the information about approach of the following vehicle. In this manner, the information about approach of the following vehicle that is acquired in OP104 changes depending on the approach condition that is used in OP105.

Additionally, the approach condition that is used in OP105 may be selected according to the information that is acquired in OP104 as the information about approach of the following vehicle. For example, in the case where the speed of the following vehicle is acquired in OP104 by the control unit 11, through vehicle-to-vehicle communication, as the information about approach of the following vehicle, the approach condition (1) may be used in OP105. For example, in the case where, in OP104, the control unit 11 fails to receive information through vehicle-to-vehicle communication, and acquires the inter-vehicular distance to the following vehicle from the inter-vehicular distance sensor 117, the approach condition (2) may be used in OP105. Furthermore, degrees of priority may be set for the approach conditions (1) to (3).

In the case where the approach condition is satisfied (OP105: YES), the process proceeds to OP106. In the case where the approach condition is not satisfied (OP105: NO), the process illustrated in FIG. 4 is ended. In OP106, the control unit 11 acquires information about a lane on the left side. For example, information about a lane on the left side is the captured image of the wing-mirror camera 114 that includes the left wing mirror in the captured image or the captured image of the rearward camera 113 that takes a predetermined range in the back as the capturing range.

In OP107, the control unit 11 determines whether or not it is possible to change lanes to the lane on the left side. For example, the control unit 11 analyzes the captured image of the wing-mirror camera 114 that includes the left wing mirror in the captured image, and in the case where the wing mirror does not show a vehicle on the lane on the left side, the control unit 11 determines that it is possible to change lanes to the lane on the left side. In the case where it is determined that it is possible to change lanes to the lane on the left side (OP107: YES), the process proceeds to OP108. In the case where it is determined that it is not possible to change lanes to the lane on the left side (OP107: NO), the process illustrated in FIG. 4 is ended.

In OP108, the control unit 11 outputs a guidance to change lanes from the passing lane to the lane on the left side. Then, the process illustrated in FIG. 4 is ended.

FIG. 5 is an example of a flowchart of an information transmission process by the vehicle 100. The process illustrated in FIG. 5 may be repeatedly performed every predetermined period of time, or may be started with occurrence of a predetermined event as a trigger, for example. The predetermined event may be stepping of the brake pedal or/and the accelerator pedal by a predetermined value or more, or in other words, occurrence of rapid braking and/or rapid acceleration. The process illustrated in FIG. 5 is also described taking a functional structural element as the performer.

In OP201, the control unit 11 acquires the type of the travel lane of the vehicle 100 from the travel lane determination unit 12, for example. Types of travel lane of the vehicle 100 include, but are not limited to, the passing lane and other than the passing lane, for example.

In OP202, the control unit 11 acquires the speed from the speedometer 115. In OP203, the control unit 11 transmits the speed and the type of the travel lane of the vehicle 100 to a vehicle traveling in front through the vehicle-to-vehicle communication unit 105. The speed and the type of the travel lane of the vehicle 100 are transmitted by broadcast or multicast, for example. Furthermore, in the case where the vehicle-to-vehicle communication unit 105 is capable of controlling directivity, the speed and the type of the travel lane of the vehicle 100 are transmitted to the vehicle in front of the vehicle 100. Then, the process illustrated in FIG. 5 is ended. Additionally, the information that is provided by the vehicle 100 to other vehicles through vehicle-to-vehicle communication is not limited to the speed and the type of the travel lane of the vehicle 100.

The processes illustrated in FIGS. 4 and 5 are merely examples, and the lane change guidance process and the information transmission process are not limited to the processes illustrated in FIGS. 4 and 5. For example, the order of execution of processes may be changed as appropriate according to the embodiment.

Effects of First Embodiment

In the first embodiment, when a vehicle approaching from behind is detected, the vehicle 100 outputs a guidance to change lanes to a lane on the left side. When the driver changes lanes to the lane on the left side according to the guidance, it is possible to smoothly give way to the vehicle approaching from behind, and worsening of the flow of vehicles on the road may be suppressed.

Furthermore, in the first embodiment, the vehicle 100 checks the state of the lane on the left side, and in the case where it is possible to change lanes to the lane on the left side, the guidance to change lanes is output. Furthermore, a vehicle approaching from behind is detected in a state where an inter-vehicular distance sufficient for changing lanes is secured. Accordingly, the vehicle 100 may safely change lanes when a vehicle approaching from behind is detected.

Furthermore, in the first embodiment, in the case where the vehicle approaching from behind is a vehicle that is capable of vehicle-to-vehicle communication, the speed and the like of the vehicle may be acquired through vehicle-to-vehicle communication. The relative speed to the following vehicle may be acquired by a sensor provided in the vehicle 100, but acquiring speed information from the following vehicle itself allows the relative speed to be more accurately acquired.

Moreover, in the first embodiment, the lane change guidance process is performed in a case where the vehicle 100 and the following vehicle are traveling on the same passing lane. Accordingly, it may be suppressed that the guidance to change lanes is issued frequently.

OTHER EMBODIMENTS

The embodiment described above is an example, and the present disclosure may be changed and carried out as appropriate without departing from the gist of the present disclosure.

In the first embodiment, a description is given assuming a road environment in Japan, but the technique described in the first embodiment may also be applied to road environments in other countries. In the case of application in another country, the types of travel lanes of the vehicle 100 and the following vehicle may be identified according to the road environment of the country in question.

In the first embodiment, a description is given of a case where the guidance to change lanes is issued when a following vehicle is approaching from behind in a case where the vehicle 100 and the following vehicle are both traveling on the passing lane. However, issuance of the guidance to change lanes according to approach of a following vehicle from behind may be performed regardless of the type of the lane.

The processes and means described in the present disclosure may be freely combined to the extent that no technical conflict exists.

A process which is described to be performed by one device may be performed divided among a plurality of devices. Processes described to be performed by different devices may be performed by one device. Each function is to be implemented by which hardware component (server component) in a computer system may be flexibly changed.

The present disclosure may also be implemented by supplying a computer program for implementing a function described in the embodiment above to a computer, and by reading and executing the program by at least one processor of the computer. Such a computer program may be provided to a computer by a non-transitory computer-readable storage medium which is connectable to a system bus of a computer, or may be provided to a computer through a network. The non-transitory computer-readable storage medium may be any type of disk such as a magnetic disk (floppy (registered trademark) disk, a hard disk drive (HDD), etc.), an optical disk (CD-ROM, DVD disk, Blu-ray disk, etc.), a read only memory (ROM), a random access memory (RAM), an EPROM, an EEPROM, a magnetic card, a flash memory, an optical card, and any type of medium which is suitable for storing electronic instructions.

What is claimed is:

1. An information processing apparatus mounted on a vehicle, the information processing apparatus comprising a controller configured to:
    detect whether or not the vehicle and a following vehicle are traveling on a same lane,
    acquire position information of the vehicle,
    transmit an inquiry to an external device together with the position information of the vehicle, and acquire a type of a traveling lane of the vehicle from the external device,
    acquire information about the following vehicle via vehicle-to-vehicle communication, a vehicle-mounted sensor, or a vehicle-mounted camera,
    determine whether or not the following vehicle is approaching at a speed faster than a speed of the vehicle with a different method according to which of the vehicle-to-vehicle communication, the vehicle-mounted sensor, and the vehicle-mounted camera acquires the information about the following vehicle, and
    output a guidance to change lanes on a condition that the vehicle being not close to an intersection and that a road where the vehicle is travelling having two or more lanes, in a case where the vehicle and the following vehicle are traveling on the same lane, and the following vehicle is approaching at a speed faster than the speed of the vehicle.

2. The information processing apparatus according to claim 1, wherein the controller is configured to:
    acquire information about a traveling state of a vehicle on a first lane that is adjacent to the lane where the vehicle is traveling and that is not a passing lane, and
    output the guidance to changes lanes to the first lane, in a case where the vehicle is allowed to change lanes to the first lane.

3. The information processing apparatus according to claim 2, wherein the controller is configured to determine that changing lanes to the first lane is possible, in a case where an image shown in a wing mirror of the vehicle shows no vehicle on the first lane.

4. The information processing apparatus according to claim 1, wherein the controller is configured to determine whether or not the following vehicle is approaching at a speed faster than the speed of the vehicle, based on at least one of a relative speed, an inter-vehicular distance and a inter-vehicular time to the following vehicle.

5. The information processing apparatus according to claim 4, wherein, in a case where the information about the following vehicle is acquired via the vehicle-to-vehicle communication, the controller is configured to acquire the relative speed to the following vehicle based on a speed of the following vehicle which is included in the information about the following vehicle.

6. The information processing apparatus according to claim 4, wherein, in a case where the information about the following vehicle is acquired via the vehicle-mounted sensor,
    the controller is configured to acquire the inter-vehicular distance or the inter-vehicular time to the following vehicle based on a detection value of the vehicle-mounted sensor.

7. The information processing apparatus according to claim 1, wherein the controller is configured to acquire, through the vehicle-to-vehicle communication, information about a lane where the following vehicle is traveling from the following vehicle.

8. The information processing apparatus according to claim 1, wherein the controller is configured to transmit, through the vehicle-to-vehicle communication and at a predetermined timing, the speed of the vehicle to a vehicle traveling in front of the vehicle.

9. An information processing method performed by a computer that is mounted on a vehicle, the information processing method comprising:
    detecting whether or not the vehicle and a following vehicle are traveling on a same lane,
    acquiring position information of the vehicle,
    transmitting an inquiry to an external device together with the position information of the vehicle, and acquiring a type of a traveling lane of the vehicle from the external device,
    acquiring information about the following vehicle via vehicle-to-vehicle communication, a vehicle-mounted sensor, or a vehicle-mounted camera,
    determining whether or not the following vehicle is approaching at a speed faster than a speed of the vehicle with a different method according to which of the vehicle-to-vehicle communication, the vehicle-mounted sensor and the vehicle-mounted camera acquires the information about the following vehicle, and
    outputting a guidance to change lanes on a condition that the vehicle being not close to an intersection and that a road where the vehicle is travelling having two or more lanes, in a case where the vehicle and the following vehicle are traveling on the same lane, and the following vehicle is approaching at a speed faster than the speed of the vehicle.

10. The information processing method according to claim 9, including:
    acquiring information about a traveling state of a vehicle on a first lane that is adjacent to the lane where the vehicle is traveling and that is not a passing lane, and
    outputting the guidance to changes lanes to the first lane, in a case where the vehicle is allowed to change lanes to the first lane.

11. The information processing method according to claim 10, including determining changing lanes to the first lane to be possible, in a case where an image shown in a wing mirror of the vehicle shows no vehicle on the first lane.

12. The information processing method according to claim 9, including determining whether or not the following vehicle is approaching at a speed faster than the speed of the vehicle, based on at least one of a relative speed, an inter-vehicular distance and a inter-vehicular time to the following vehicle.

13. The information processing method according to claim 12, including, in a case where the information about the following vehicle is acquired via the vehicle-to-vehicle communication, acquiring the relative speed to the following vehicle based on a speed of the following vehicle which is included in the information about the following vehicle.

14. The information processing method according to claim 12, wherein, in a case where the information about the following vehicle is acquired via the vehicle-mounted sensor, the information processing method including acquiring the inter-vehicular distance or the inter-vehicular time to the following vehicle based on a detection value of the vehicle-mounted sensor.

15. The information processing method according to claim 9, including acquiring information about a lane where the following vehicle is traveling from the following vehicle through the vehicle-to-vehicle communication.

16. The information processing method according to claim 9, including transmitting, through the vehicle-to-vehicle communication and at a predetermined timing, the speed of the vehicle to a vehicle traveling in front of the vehicle.

* * * * *